(12) United States Patent
Toishi et al.

(10) Patent No.: US 7,760,611 B2
(45) Date of Patent: Jul. 20, 2010

(54) HOLOGRAM REPRODUCING APPARATUS

(75) Inventors: Mitsuru Toishi, Kanagawa (JP); Kazutatsu Tokuyama, Tokyo (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 11/866,866

(22) Filed: Oct. 3, 2007

(65) Prior Publication Data

US 2009/0028032 A1    Jan. 29, 2009

(30) Foreign Application Priority Data

Oct. 17, 2006    (JP) .................... P2006-282699

(51) Int. Cl.
*G11B 7/00* (2006.01)
(52) U.S. Cl. .................................... 369/103
(58) Field of Classification Search .............. None
See application file for complete search history.

(56) References Cited

U.S. PATENT DOCUMENTS

| | | | |
|---|---|---|---|
| 6,452,890 B2 * | 9/2002 | Kawano et al. | 369/110.01 |
| 7,206,108 B2 * | 4/2007 | Tsukagoshi | 359/35 |
| 7,262,892 B1 * | 8/2007 | Yasuda et al. | 359/29 |
| 2001/0002895 A1 * | 6/2001 | Kawano et al. | 369/103 |

FOREIGN PATENT DOCUMENTS

| | | | |
|---|---|---|---|
| JP | 52011940 A | * | 1/1977 |
| JP | 2003 18475 | | 1/2003 |
| JP | 2004 226821 | | 8/2004 |

OTHER PUBLICATIONS

Nikkei Electronics, Jan. 17, 2005, pp. 106-114.

\* cited by examiner

*Primary Examiner*—Peter Vincent Agustin
(74) *Attorney, Agent, or Firm*—K&L Gates LLP

(57) ABSTRACT

A hologram reproducing apparatus includes a reference-light spatial-light modulating section that displays a reference light pattern for generating reference light, an image sensor that has pixels arrayed two-dimensionally that receive diffractive light generated by irradiating the reference light on a hologram recording medium, and a control unit that processes an electric signal from the image sensor and reproduces recording data. The control unit detects a predetermined area electric signal, detects a hologram electric signal, subtracts the predetermined area electric signal from the hologram electric signal to obtain a reproduced signal after noise reduction, and reproduces the recording data from the reproduced signal after noise reduction.

4 Claims, 17 Drawing Sheets

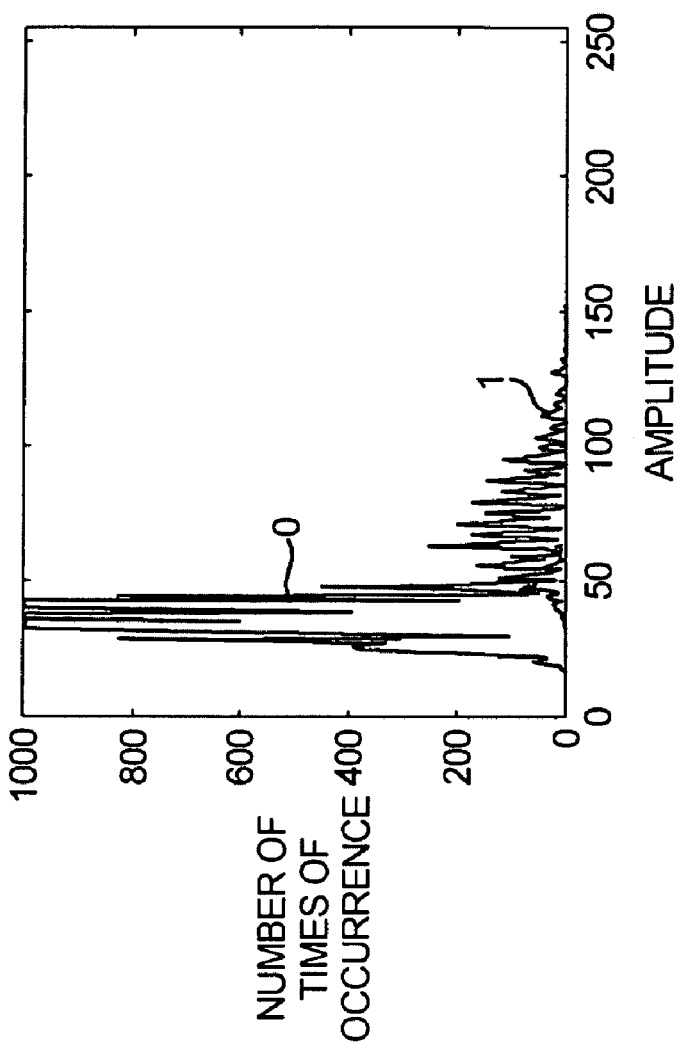
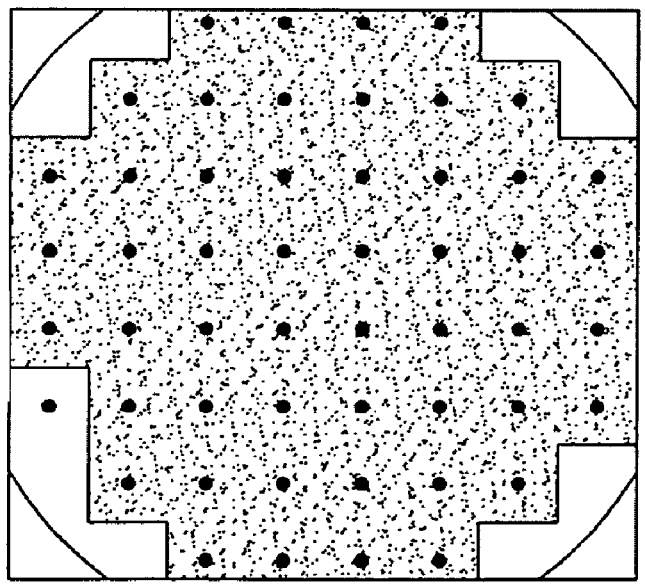

FIG. 15

| SAMPLE NUMBER | NUMBER OF ERRORS ||
| --- | --- | --- |
| | BEFORE FPN REMOVAL | AFTER FPN REMOVAL |
| 1 | 671 | 575 |
| 2 | 526 | 456 |
| 3 | 350 | 252 |
| 4 | 134 | 62 |
| 5 | 63 | 35 |
| 6 | 31 | 17 |

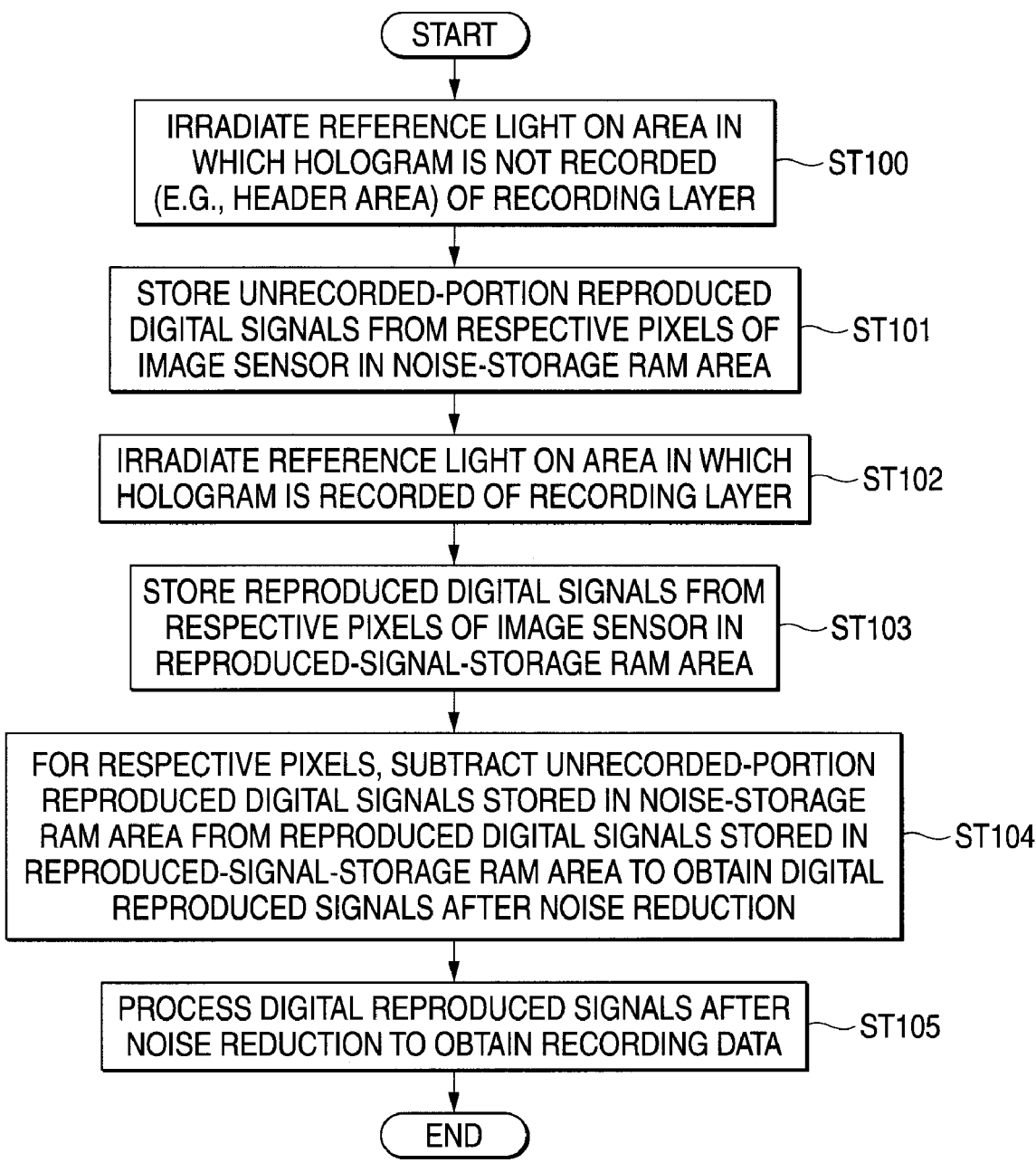

HOLOGRAM REPRODUCING APPARATUS

CROSS-REFERENCES TO RELATED APPLICATIONS

The present application claims priority to Japanese Patent Application JP 2006-282699 filed in the Japanese Patent Office on Oct. 17, 2006, the entire contents of which is being incorporated herein by reference.

BACKGROUND

The present application relates to a hologram reproducing apparatus.

In recent years, along with attainment of high density recording, a hologram recording and reproducing apparatus, which is a recording and reproducing apparatus capable of recording and reproducing recording data at high transfer speed, attracts attention. The hologram recording and reproducing apparatus makes use of a thickness direction of a recording medium in addition to a width direction thereof and, in recording of data, forms interference fringes of reference light and signal light on the basis of page data corresponding to the recording data in a form of a hologram (a diffraction grating) in a hologram recording medium with two-dimensional information as a page unit and records the page data three-dimensionally. In reproduction of the recording data, the hologram recording and reproducing apparatus irradiates the reference light on the hologram formed in this way and obtains diffractive light generated by the irradiation to reproduce the recording data (see, JP-A-2004-226821 and "Nikkei Electronics", Jan. 17, 2005, pp 106 to 114).

In recording of data, the hologram recording and reproducing apparatus displays two-dimensional information on a spatial light modulator (SLM) for each page and generates signal light and reference light to form a hologram. In reproduction of the recording data, the hologram recording and reproducing apparatus irradiates the reference light on the hologram to generate diffractive light and captures an electric signal corresponding to a reproduced image formed by this diffractive light with a two-dimensional imaging element represented by a CCD or CMOS image sensor. Therefore, there are a large number of sources of noise occurrence that are not present in optical disk recording and reproducing apparatuses in the past. A technique for reducing noise from such noise occurrence sources is necessary.

As a technique for noise reduction in a related technical field known in the past, there is a technique for noise reduction in the field of solid state imaging devices (see JP-A-2003-18475). This is a technique for outputting dark state data from a solid state imaging device using a light shielding jig in the manufacturing of a solid state imaging apparatus, outputting this dark state data to a CPU in the solid state imaging apparatus, detecting fixed pattern noise of the solid state imaging device from the dark state data with the CPU, compressing the detected fixed pattern noise and storing the fixed pattern noise in a nonvolatile memory, and, in actual use of the solid state imaging apparatus, moving information on the fixed pattern noise from the nonvolatile memory to a memory in an image processing circuit and storing the information therein, performing addition or subtraction of an imaging signal outputted from the solid state imaging device and the fixed pattern noise read out from the memory, and removing the fixed pattern noise from the solid state imaging signal.

However, a process of noise occurrence in the hologram recording and reproducing apparatus is different from a process of noise occurrence, in the solid state imaging apparatus. For example, stray light from an optical system has a significant influence on hologram reproduction as noise. When the hologram recording and reproducing apparatus performs multiplexing for forming plural holograms by sharing one recording area, crosstalk and the like among the holograms also have an extremely significant influence on hologram reproduction as noise in volume recording for recording plural holograms in one place. In a coaxial system for coaxially arranging signal light and reference light, light intensity of the reference light is larger than light intensity of diffractive light by about 2 to 3 digits. Thus, noise due to a contrast of the SLM (SLM contrast noise described later) occurs. Moreover, noise caused by the reference light leaking to an area in which the signal light is arranged (reference light leak noise described later) and the like are extremely significant problems.

Such noise due to the optical system has different scattering degrees of light beams depending on characteristics of hologram recording media. The influence of the noise is different for each of the hologram recording media and also different depending on characteristics of SLMs. Therefore, the influence is not uniform in each of hologram recording and reproducing apparatuses that use these optimal members. In this regard, a process of occurrence of noise is different from that of the fixed pattern noise in JP-A-2003-18475. Thus, it is difficult to obtain the effect of noise reduction with the technique disclosed in JP-A-2003-18475. When attention is paid to electric noise of a detection system that detects reproduced signal from diffractive light, in general, random noise, an output of which fluctuates as time passes, and fixed pattern noise appearing as steady output offset become noise sources at the time of signal reproduction and cause deterioration in an error rate. Consequently, a signal to noise ratio (SNR) of a reproduced image is deteriorated. In particular, when multiple recording is adopted, there is a conspicuous influence in that multiplicity is limited. However, a technique for removing the noise peculiar to holograms caused by the factors described above is unknown. From the viewpoint of ensuring compatibility when a hologram recording and reproducing apparatus and a hologram recording medium are appropriately combined and from the viewpoint of attaining high recording density using multiplexing and the like, a technique for removing, in reproducing a hologram, noise that occurs in hologram recording and reproduction is necessary.

Therefore, it is desirable to provide a technique for removing noise in hologram recording and reproduction.

SUMMARY

According to an embodiment, there is provided a hologram reproducing apparatus that reproduces recording data from a hologram formed in a recording layer of a hologram recording medium by causing signal light modulated according to the recording data and reference light from a light source identical with that of the signal light to interfere with each other. The hologram reproducing apparatus includes a reference-light spatial-light modulating section that displays a reference light pattern for generating the reference light, an image sensor that has pixels arrayed two-dimensionally that receive diffractive light generated by irradiating the reference light on the hologram recording medium, and a control unit that processes an electric signal from the image sensor and reproduces the recording data. The control unit defects a predetermined area electric signal, which is an electric signal from the image sensor obtained by irradiating the reference light on a predetermined area of the hologram recording medium, detects a hologram electric signal, which is an electric signal from the image sensor obtained by irradiating the reference light on an area in which the hologram is formed of the hologram recording medium, subtracts the predetermined area electric signal from the hologram electric signal to obtain a reproduced signal after noise reduction, and reproduces the recording data from the reproduced signal after noise reduction.

In this hologram reproducing apparatus, the control unit detects the predetermined area electric signal, which is an electric signal from the image sensor obtained by irradiating the reference light on the predetermined area of the hologram recording medium, detects the hologram electric signal from the image sensor obtained by irradiating the reference light, on the area in which the hologram is formed of the hologram recording medium, subtracts the predetermined area electric signal from the hologram electric signal to obtain the reproduced signal after noise reduction, and reproduces the recording data from the reproduced signal after noise reduction. Therefore, it is possible to reduce, noise due to the optical system and the hologram recording medium and obtain a satisfactory reproduction characteristic.

According to another embodiment, there is provided a hologram reproducing apparatus that reproduces recording data from a hologram formed in a recording layer of a hologram recording medium by causing signal light modulated according to the recording data and reference light from a light source identical with that of the signal light to interfere with each other. The hologram reproducing apparatus includes a reference-light spatial-light modulating section that displays a reference light pattern for generating the reference light, an image sensor that has pixels arrayed two-dimensionally that receive diffractive light, generated by irradiating the reference light on the hologram recording medium, and a control unit that processes an electric signal from the image sensor and reproduces the recording data. The control unit defects a light beam stop electric signal, which is an electric signal obtained from the image sensor by stopping irradiation of a light beam from the light source, detects a hologram electric signal, which is an electric signal obtained from the image sensor by irradiating the reference light on an area in which the hologram is formed of the hologram recording medium, subtracts the light beam stop electric signal from the hologram electric signal to obtain a reproduced signal after noise reduction, and reproduces the recording data from the reproduced signal after noise reduction.

In this hologram recording apparatus, the control unit, detects the electric signal obtained from the image sensor by stopping irradiation of the light beam from the light source, detects the reproduced signal from the image sensor obtained by irradiating the reference light on the area in which the hologram is formed of the hologram recording medium, subtracts the electric signal from the reproduced signal to obtain the reproduced signal after noise reduction, and reproduces the recording data from the reproduced signal after noise reduction. Therefore, it is possible to reduce noise due to the circuit unit and obtain a satisfactory reproduction characteristic.

According to an embodiment, it is possible to remove noise in hologram recording and reproduction. As a result, it is possible to provide a technique for ensuring compatibility between the hologram recording and reproducing apparatus and the hologram recording medium and making it possible to perform high-density hologram recording.

Additional features and advantages are described herein, and will be apparent from, the following Detailed Description and the figures.

BRIEF DESCRIPTION OF THE FIGURES

FIG. 13A is an illustration representative of a monitor image obtained as a result of an experiment;

FIG. 13B is a graph showing an output frequency distribution after A/D conversion;

FIG. 15 is a table of a result of an experiment indicating the effect of noise reduction for plural samples;

FIG. 17 is a flowchart of noise reduction processing.

DETAILED DESCRIPTION

The present application will be described below in greater detail according to an embodiment and with reference to the figures. First, a principle of hologram recording and reproduction is explained concerning a coaxial optical system as an optical system for the hologram recording and reproduction according to an embodiment. Then, a hologram recording medium is explained and a hologram recording and reproducing apparatus including such a coaxial optical system is explained. After that, a characteristic part of the embodiment is explained. The coaxial optical system is a general name of an optical system characterized in that signal light and reference light described later share a part of an optical path of a light beam.

(Optical System of a Coaxial System)

An overview of a coaxial optical system 10 is explained with reference to FIG. 1 and an overview of a coaxial optical system 11 is explained with reference to FIG. 2.

Figure 1:
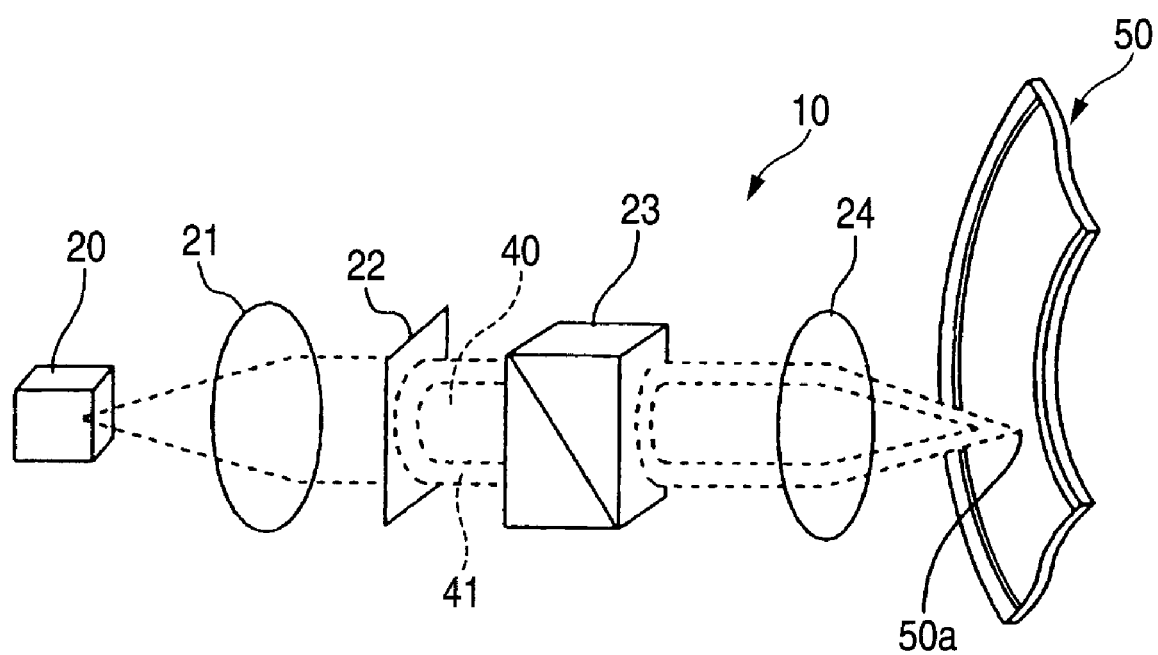
FIG. 1 is a diagram showing a concept of a coaxial optical system in a hologram recording apparatus.

The coaxial optical system 10 shown in FIG. 1 includes, as main optical components, a laser beam source 20, a collimate lens 21, a spatial light modulator 22 formed of transmission liquid crystal, a beam splitter 23, and an object lens 24.

A light beam emitted from the laser beam source 20 is converted into parallel light by the collimate lens 21 and transmitted through the spatial light modulator 22. The spatial light modulator 22 includes two light beam transmission areas, i.e., a signal-light spatial-light modulating section 46 (see FIG. 2) that displays a signal light pattern based on recording data and a reference-light spatial-light modulating section 47 (see FIG. 2) that displays a reference light pattern. Light beams passing through the respective areas of the spatial light modulator 22 pass through common optical components, i.e., the beam splitter 23 and the object lens 24, as signal light 40 and reference light 41 that have the same center line and are coaxially arranged. In other words, the signal light 40 and the reference light 41 share an optical path and are made incident on a recording layer 50a (see FIG. 4) of a hologram recording medium 50. The signal light 40 generated by the signal-light spatial-light modulating section 46 and the reference light 41 generated by the reference-light spatial-light modulating section 47 interfere with each other in the recording layer 50a. A refractive index in a very small area of the recording layer 50a is changed according to a form of this interference. The recording data is recorded as a diffraction grating (a hologram) corresponding to a refractive index pattern.

Figure 2:
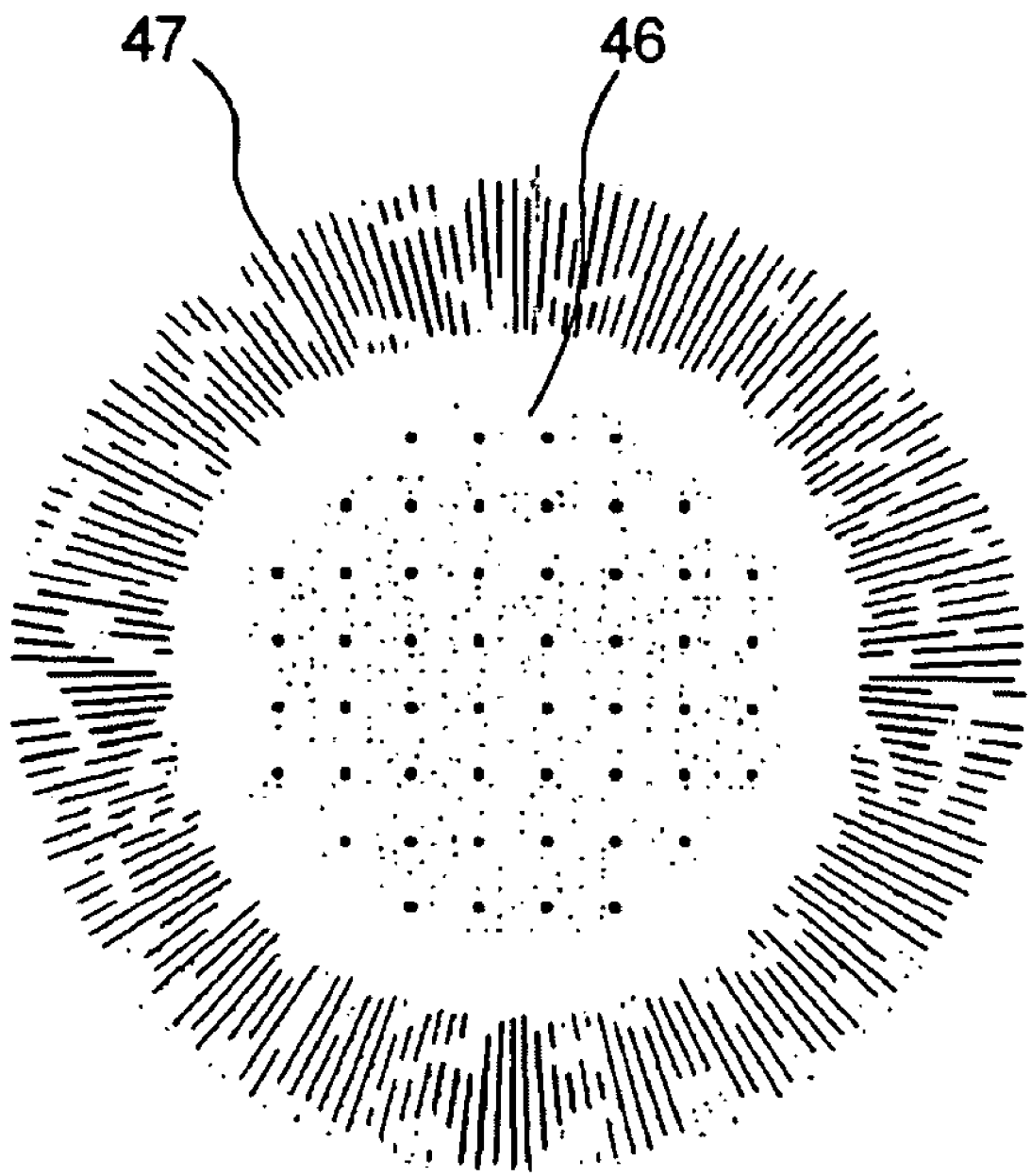
FIG. 2 is a diagram showing an example of a signal light pattern and a reference light pattern displayed on a spatial light modulator.

FIG. 2 is a diagram showing an example of a signal light pattern and a reference light pattern displayed on the spatial light modulator 22. In the patterns, the signal light pattern (a pattern generated in the signal-light spatial-light modulating section 46 according to a combination of a color portion (a white portion) and a black portion of a paper surface) is displayed in the signal-light spatial-light modulating section 46 that is a section closer to the center of the patterns. The reference light pattern (a pattern generated in the reference-light spatial-light modulating section 47 by a combination of a white portion and a black portion) is displayed in the reference-light spatial-light modulating section 47 around the signal-light spatial-light modulating section 46. In FIG. 2, the white portion is a portion that blocks a light beam and the black portion is a portion that transmits a light beam. Forms of signal light and reference light change according to an arrangement of the black portion and the white portion. The white portion and the black portion can be controlled for each of very small areas finely divided two-dimensionally.

An example of the reference light pattern for recording data is not limited to the pattern of a spoke shape (a pattern in which a white portion and a black portion are sectioned by lines extending in a concentric circle shape) and may be, for example, a random pattern, which is a pattern in which a white portion and a black portion are spatially arranged at random by generating random numbers in advance.

Figure 3:
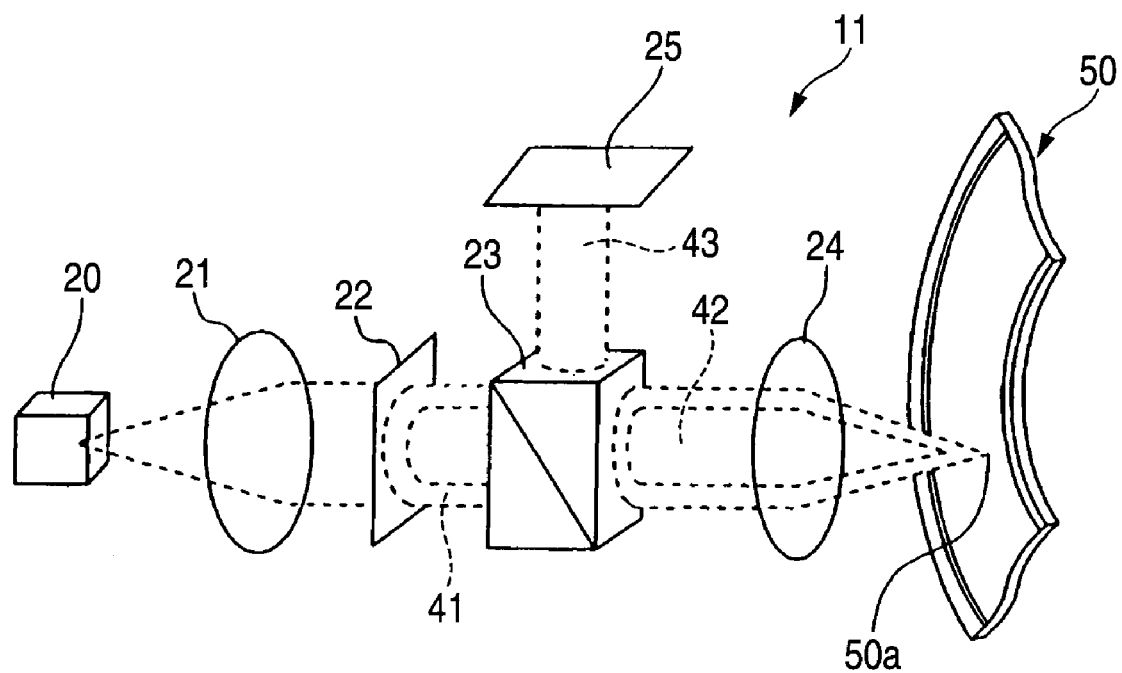
FIG. 3 is a diagram showing a concept of a coaxial optical system in a hologram reproducing apparatus.

A conceptual diagram of the coaxial optical system 11 used in a hologram reproducing apparatus of a coaxial system is shown in FIG. 3. The hologram reproducing apparatus of the coaxial system includes, in addition to the laser beam source 20, the collimate lens 21, the spatial light modulator 22, the beam splitter 23, and the object lens 24, an image sensor 25 including a charge coupled device (CCD) or complementary metal oxide semiconductor (CMOS) sensor or the like.

Figure 4:
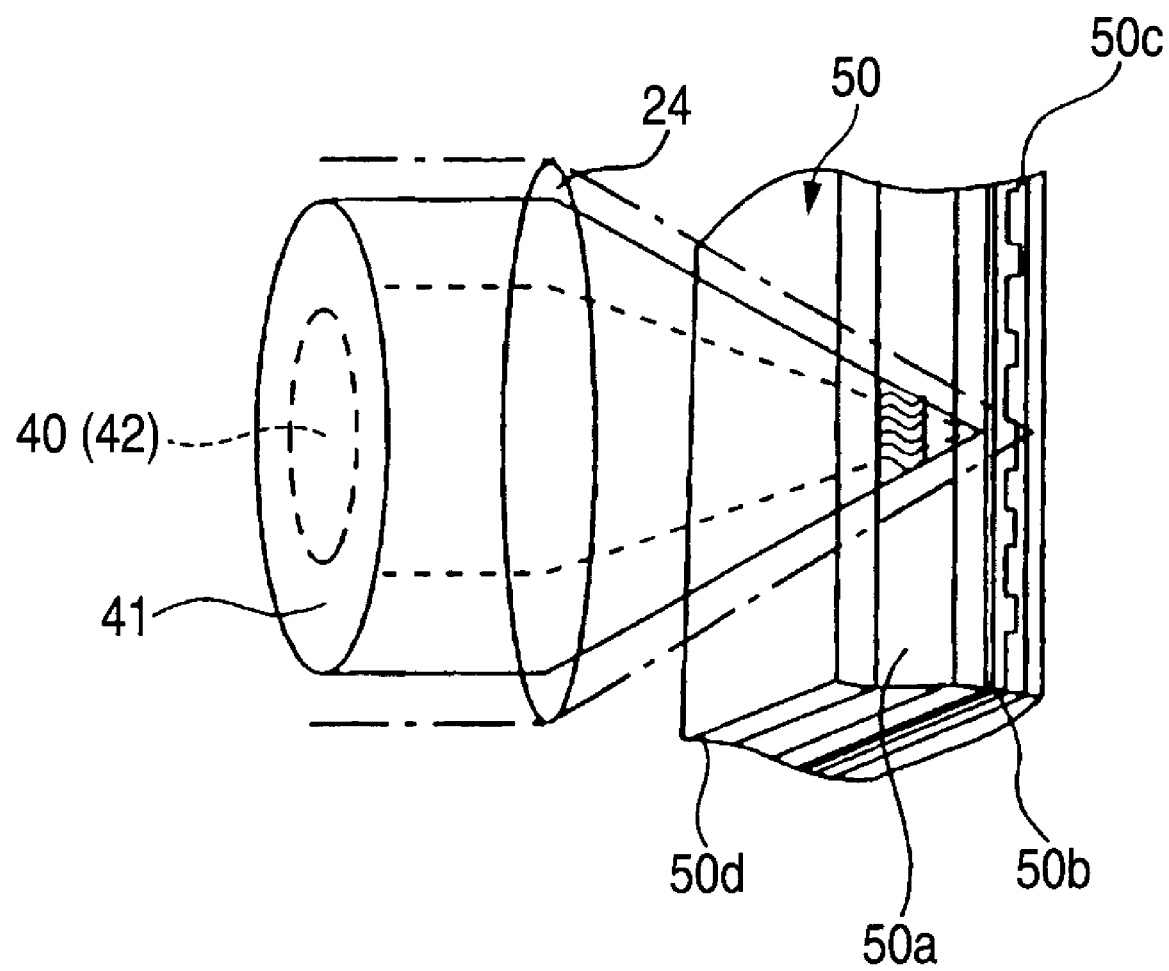
FIG. 4 is a diagram schematically showing a structure of a hologram recording medium cut in a cross section direction.

In reproduction, only a reference light pattern is displayed in the reference-light spatial-light modulating section 47 of the spatial light modulator 22 and a totally black pattern (a pattern of only a black portion that blocks transmission of a light beam) is displayed in the signal-light spatial-light modulating section 46. The reference light 41 from the reference-light spatial-light modulating section 47 is transmitted through the beam splitter 23 and the object lens 24 and made incident on a hologram formed in the recording layer 50a of the hologram recording medium 50, whereby recording data is reproduced. Diffractive light 42 corresponding to the hologram is generated by the reference light. A traveling direction of the diffractive light 42 as a light beam is changed by the beam splitter 23. The diffractive light 42 illuminates the image sensor 25 as diffractive light 43. An electric signal from the image sensor 25 having pixels arranged two-dimensionally is a signal corresponding to a shape of the hologram, i.e., the recording data. Thus, the recording data can be reproduced from this electric signal in a not-shown reproduced-signal processing unit. As shown in FIG. 4, a coaxial optical system is characterized in that signal light, reproduced light, and diffractive light are arranged in a coaxial shape (coaxially).

(Structure of the Hologram Recording Medium)

FIG. 4 is a diagram schematically showing the structure of the hologram recording medium 50 cut in a cross section direction. The diagram further schematically shows how the signal light 40 (a light beam that passes on the inner side of a broken line and reaches from the spatial light modulator 22 (see FIG. 1) to the recording layer 50a), the diffractive light 42 (a light beam that passes on the inner side of the broken line in the same manner as the signal light 40 and reaches from the recording layer 50a to the beam splitter 23 (see FIG. 3)), the reference light 41 (a light beam that passes between a solid line and the broken line and reaches from the spatial light modulator 22 (see FIG. 1) to the recording layer 50a), and a light beam for servo (a light beam that passes on the inner side of an alternate long and short dash line) are made incident on the object lens 24. The hologram recording medium 50 has a protection film 50d, a recording layer 50a, a reflection film 50b for a light beam for recording and reproduction, and an address groove 50c.

At the time of recording, a hologram is formed in the recording layer 50a according to a shape of interference fringes generated by the interference between the signal light 40 and the reference light 41. At the time of reproduction, only the reference light 41 is irradiated on this hologram. Consequently, the diffractive light 42 corresponding to the hologram is reflected on an area substantially identical with an area of the signal light 40 at the time of recording by the reflection film 50b, passes through the object lens 24, and forms an image (a reproduced image) on the image sensor 25. On the other hand, the light beam for servo is transmitted through the reflection film 50b having a wavelength selection characteristic and reflected on an aluminum reflection film in which the address groove 50c is formed. According to a principle same as that in a CD and a DVD, error signals for servo necessary for processing of focus servo, radial servo, and spindle servo and an address signal for specifying a position of the recording layer 50a of the hologram recording medium 50 on which a light beam is irradiated are obtained by the control unit on the basis of an electric signal detected from a photodetector of an optical system for servo.

The light beam for recording and reproduction is, for example, a light beam from a blue laser diode (a blue light beam). The light beam for servo is, for example, a light beam from a red laser diode (a red light beam). A positional relation between optical paths on which both the light beams pass is specified in advance by specifying an arrangement of the optical components. As a result, by performing servo using the red light beam, a position where a hologram is formed by the blue light beam (the signal light 40 and the reference light 41) is specified by an action of this servo. A position where recording data is reproduced from the hologram by the blue light beam (the reference light 41, the diffractive light 42, and the diffractive light 43) is specified by the action of this servo. Hologram recording and reproduction can be performed in a predetermined position of the recording layer 50a of the hologram recording medium 50.

(Hologram Recording and Reproducing Apparatus Employing the Optical System of the Coaxial System)

In the hologram recording and reproducing apparatus employing the coaxial optical system (hereinafter referred to as hologram recording apparatus of the coaxial system), by sharing a part of an optical path of a light beam among signal light, reference light, and diffractive light, recording and reproduction can be performed using an identical object lens. Thus, the optical system can be simplified. Moreover, since the hologram recording and reproducing apparatus is relatively easily compatible with the optical disks such as the CD and the DVD in the past, the hologram recording and reproducing apparatus attracts attention as a recording and reproducing apparatus in the future.

Figure 5:
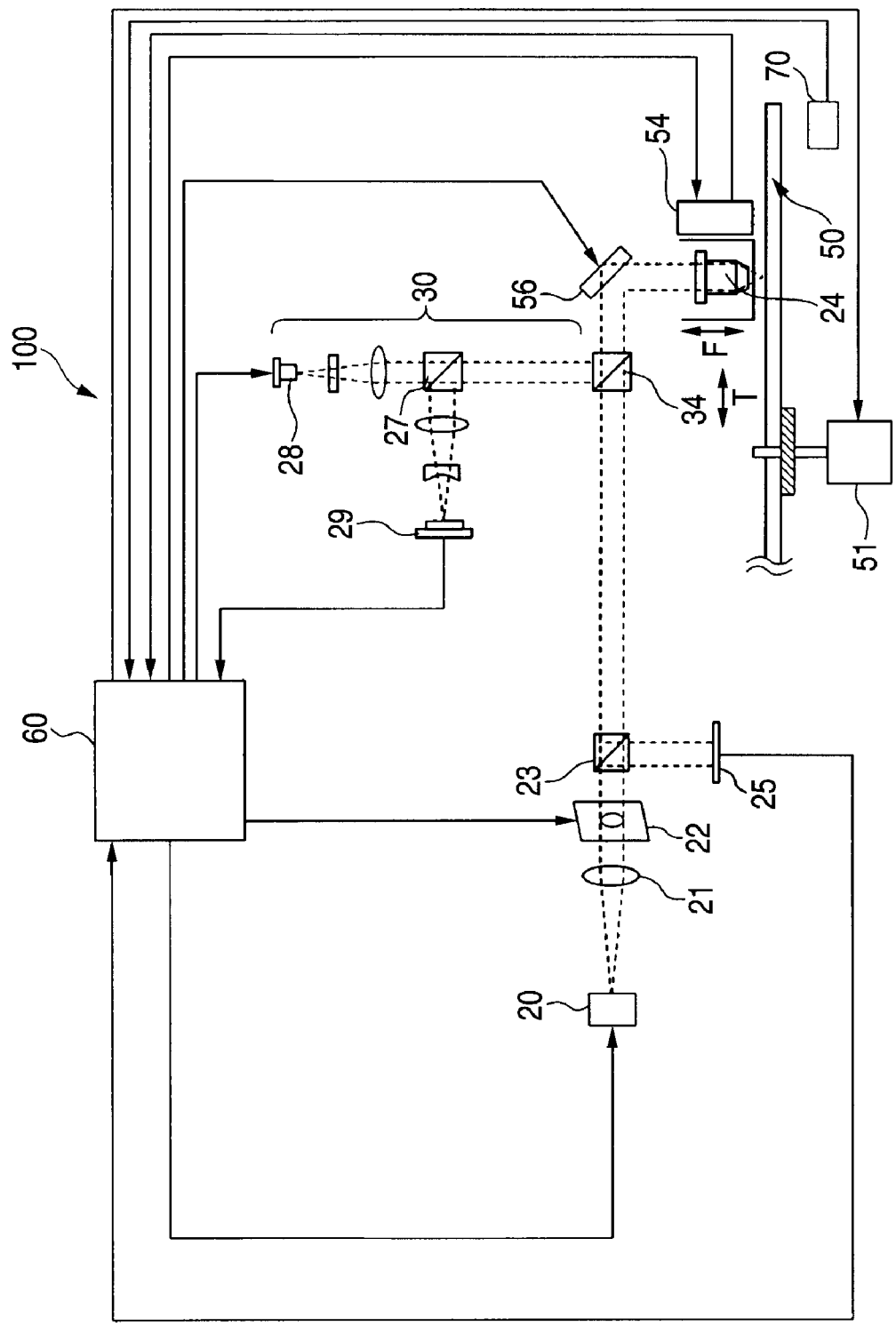
FIG. 5 is a schematic diagram of a hologram recording and reproducing apparatus according to an embodiment with an optical unit shown in the center.

FIG. 5 is a schematic diagram of a hologram recording and reproducing apparatus 100 with an optical unit shown in the center. The hologram recording and reproducing apparatus 100 is an example of the hologram recording apparatus. Components same as those cited in the above explanation are denoted by the identical reference numerals. Explanation of the components is omitted.

An optical system for servo 30 is arranged in the hologram recording and reproducing apparatus 100. Only main optical components constituting the optical system for servo 30 are denoted by reference numerals and briefly explained. A light source for servo 28 emits a light beam for servo. The light beam for servo is a light beam having a longer wavelength (e.g., a light beam from a red laser) different from a wavelength of a light beam from the laser beam source 20 for recording and reproduction. Thus, the light beam for servo and the light beam for recording and reproduction can be separated. Since photopolymer is not reactive to the red light beam, the recording layer 50a (see FIG. 4) is not affected by the red light beam.

A beam splitter 27 guides return light from the hologram recording medium 50 to a photodetector 29. The photodetector 29 has a structure in which a detector is divided into plural sections to be applicable to, for example, an astigmatic method for focus servo (position control in a direction indicated by reference sign F in FIG. 5) and a push-pull method for radial (tracking) servo (position control in a direction indicated by reference sign T in FIG. 5). A dichroic mirror 34 is an optical component common to the optical system for servo 30 and the optical system for recording and reproduction and is a wavelength separating element that separates the light beam for servo and the light beam for recording and reproduction. A reflection mirror 56 changes traveling directions of the light beam for servo and the light beam for recording and reproduction to guide the light beams to the object lens 24 and changes traveling directions of diffractive lights from the address groove 50c (see FIG. 5) of the hologram recording medium 50 and the hologram to guide the diffractive lights to the optical system for servo 30 and the optical system for recording and reproduction. The reflection mirror 56 functions as a mechanism unit for performing angle multiplication as well.

A spindle motor 51 rotates the hologram recording medium 50 having an external shape same as that of the optical disks such as the CD and the DVD in the past around the geometrical center of a disc shape thereof. A rotating position of the hologram recording medium 50 is controlled by a control signal from a control unit 60. A temperature detector 70 is arranged to be in contact with the hologram recording medium 50 to have low thermal conductivity or arranged near the hologram recording medium 50.

The control unit 60 performs control of operations of the hologram recording and reproducing apparatus 100. For example, the control unit 60 performs control of the laser beam source 20, control of a reference light pattern and a signal light pattern displayed on the spatial light modulator 22, control of the reflection mirror 56, control of the light source for servo 28, control of the focus servo and the radial servo using an actuator for servo 54 through processing of a servo signal from the photodetector 29, control of the spindle motor 51, and control of recording and reproduction through detection of the temperature of the hologram recording medium 50 by the temperature detector 70. Moreover, the control unit 60 performs processing for noise reduction, which is the main point of this embodiment.

The hologram recording and reproducing apparatus 100 has all functions of a hologram recording and reproducing apparatus that can perform recording and reproduction of a hologram. However, even when the hologram recording and reproducing apparatus 100 is constituted as a hologram recording apparatus including only components related to hologram recording or constituted as a hologram reproducing apparatus including only components related to hologram reproduction, functions of the hologram recording apparatus or the hologram reproducing apparatus can be readily realized.

(Noise Reduction in Embodiments)

A technique for noise reduction adopted when the hologram recording and reproducing apparatus 100 and the hologram recording medium 50 are used is described. In all embodiments, noises due to various causes included in images formed on the image sensor 25 (generally referred to as caused noises) are separated for each of causes as known caused noises in advance. The caused noises are separated by superimposing the caused noises on an image (reproduced image) formed on the image sensor 25 (adding the caused noises to and subtracting the caused noises from the image). A type of noise that can be reduced is different depending on how the caused noises are separated.

Actual addition and subtraction of caused noise is performed by the control unit 60 at a stage of electric processing after a reproduced image formed on a light-receiving surface of the image sensor 25 by the diffractive light 43 is converted into an electric signal rather than at a stage of optical processing. In all the embodiments, electric noise signals due to various causes included in an electric signal from the image sensor 25 (generally referred to as caused electric noise signal) are separated as known caused electric noise signals for each of causes of the caused noises. The caused electric noise signals from the image sensor 25 are reduced by adding the caused electric noise signals to and subtracting the caused electric noise signals from an electric signal from the image sensor 25 corresponding to a reproduced image generated by the diffractive light 43 from a hologram. A range of the effect of noise reduction is different depending on how the caused electric noise signals are separated.

(Method of Detecting a Media-Caused Electric Noise Signal and an Optical-System-Caused Electric Noise Signal, Which is a Method of Detecting a Caused Electric Noise Signal According to a First Embodiment)

The reference light 41 is irradiated on an area in which a hologram is not formed of the recording layer 50a of the hologram recording medium 50 to obtain the diffractive light 42 and the diffractive light 43 and an actual image is formed on the image sensor 25 by the diffractive light 43. In this case, an electric signal detected according to a reproduced image formed on the light-receiving surface of the image sensor 25 includes a media-caused electric noise signal and an optical-system-caused electric noise signal. It is possible to learn the media-caused electric noise signal and the optical-system-caused electric noise signal as known amounts.

The media-caused electric noise signal is noise due to an optical characteristic of a hologram recording medium itself. The media-caused electric noise signal includes an electric noise signal due to scratches, dust and the like of the protection film 50d and an electric noise signal due to scattering and the like in the recording layer 50a. The term of "media-caused electric noise signal" represents a noise form as an electric signal. As a term that indicates a wider concept of noise including optical noise, "media caused noise" is used.

The optical-system-caused electric noise signal is noise caused in an optical system and is mainly a stray light electric noise signal. When the spatial light modulator 22 and a phase mask are provided, stray light is caused by higher-order diffractive light from the phase mask, scattering light from the hologram recording medium 50, stray light from various optical components, and the like. This stray light is finally received on the light-receiving surface of the image sensor 25 to be changed to a stray light electric noise signal. When the coaxial optical system is adopted, the optical-system-caused electric noise signal further includes an SLM contrast electric noise signal and a reference-light-leak electric noise signal. The term of "optical-system-caused electric noise signal" represents a noise form as an electric signal. As a term indicating a wider concept of noise including optical noise, "optical system caused noise" is used. Similarly, terms "SLM contrast noise" and "reference light leak noise" are used for the SLM contrast electric noise signal and the reference-light-leak electric noise signal.

The SLM contrast electric noise signal is noise caused when a ratio of luminances of light and shade of the black portion and the white portion in the spatial light modulator 22 is not infinite. In the coaxial optical system, when a reproduction operation is performed, the signal-light spatial-light modulating section 46 is entirely the black portion for all pixels and the intensity of a signal light is ideally zero. In a usual method, the intensity of reference light at the time of reproduction is set larger than the intensity of the signal light by about 2 to 3 digits to obtain a satisfactory reproduction characteristic. When a contrast between the luminance of the white portion and the luminance of the black portion of the spatial light modulator 22 is poor (although the black portion does not transmit a light beam originally, the black portion transmits the light beam), at the time of reproduction, the signal-light spatial-light modulating section 46 is not complete black (a state in which the light beam is not transmitted at all). As a result, a signal to noise ratio (SNR) of an electric signal corresponding to an image detected by the image sensor 25 is deteriorated. The light intensity of the reference light at the time of reproduction has to be by far the larger than the intensity of diffractive light generated by the reference light. However, in the coaxial optical system, one light beam is irradiated on the spatial light modulator 22 to obtain reference light and signal light. Thus, the poor contrast of the black portion generates a light beam from the signal-light spatial-light modulating section 46 (see FIG. 2), which should originally be a complete black portion (a portion that does not transmit a light beam at all) at the time of reproduction, and deteriorates a signal to noise ratio.

As a specific example, even when the contrast of the spatial light modulator 22 is, for example, 1000:1 (whereas the light intensity obtained from the white portion is 1000, the light intensity obtained from the black portion is 1), if diffraction efficiency of diffractive light is 0.1%, the diffractive light has power 1/1000 of the power of reference light. Thus, the light intensity at the time when the black portion is displayed on the signal-light spatial-light modulating section 46 of the spatial light modulator 22 and the intensity of the diffractive light are the same. For example, when a ferroelectric crystal (FLC) is used, since a contrast is not so high, the SLM contrast electric noise signal is large.

The reference-light-leak electric noise signal is, in the case of the coaxial optical system, noise caused when reference light and signal light are arranged in extremely close positions. The intensity of the reference light is larger than the intensity of the diffractive light by about 2 to 3 digits. Thus, in the image sensor 25, the reference light leaks to a detection area of the diffractive light and a signal to noise ratio (SNR) is deteriorated. Since an amount of leak of the reference light is larger at the end of the detection area of the diffractive light of the image sensor 25 than in the center, larger deterioration in the signal to noise ratio (SNR) is caused by the reference-light-leak electric noise signal at the end of the detection area of the diffractive light. In the first embodiment, an electric signal (in this case, a noise signal) obtained from the image sensor 25 by irradiating a light beam on a predetermined area of the hologram recording medium 50 is generally referred to as a predetermined area electric signal.

(Method of Detecting a Circuit-Unit-Caused Electric Noise Signal, Which is a Method of Detecting a Caused Electric Noise Signal According to a Second Embodiment)

Detection of a circuit-unit-caused electric noise signal due to a circuit unit of the hologram recording and reproducing apparatus 100 can be performed by supplying electricity to the circuit unit of the hologram recording and reproducing apparatus 100, blocking a light beam to prevent the light beam from being received by the image sensor 25, and obtaining an electric signal from the image sensor 25. The circuit-unit-caused electric noise signal is detected every time electric power is supplied to a hologram reproducing apparatus. Therefore, it is possible to detect a circuit-unit-caused electric noise signal corresponding to a change over time of a dark current of a photodiode, aged deterioration in a voltage of the hologram reproducing apparatus, and a change in environmental temperature. In the second embodiment, an electric signal (in this case, a noise signal) detected from the image sensor 25 is generally referred to as a light beam stop electric signal.

(Noise Reduction in the Hologram Recording and Reproducing Apparatus)

It is explained below how noise reduction is performed in the hologram recording and reproducing apparatus 100. The control unit 60 includes an analog-to-digital converter (an A/D converter) (not shown). Electric signals from respective pixels of the image sensor 25 are converted from analog signals into digital signals by this A/D converter. The digital signals after the conversion have accuracy of 8 bits or 10 bits. The control unit 60 includes a random access memory (RAM), which has a storage capacity corresponding to the number of pixels, for storing values of respective digital signals obtained from the respective pixels of the image sensor 25.

(Basic Procedure of Noise Reduction)

Reduction of the respective caused electric noise signals detected by using the method of detecting a caused electric noise signal (a media-caused electric noise signal and an optical-system-caused electric noise signal) according to the first embodiment and the method of detecting a caused electric noise signal (a circuit-unit-caused electric noise signal), respectively, is performed in accordance with a procedure described below. In the following explanation, the caused electric noise signal detected by the detection method according to the first embodiment is referred to as a first caused electric noise signal and the caused electric noise signal detected by the detection method according to the second embodiment is referred to as a second caused electric noise signal.

First, the first caused electric noise signal or the second caused electric noise signal is detected. The detected caused electric noise signal (hereinafter referred to as caused electric noise digital signal) is stored in an area of the RAM designated by predetermined addresses corresponding to the respective pixels of the image sensor 25.

A reproduced signal for each of the pixels is obtained by receiving diffractive light from a hologram, from which recording data should be reproduced, with the image sensor 25. A signal is obtained by digitizing the reproduced signal with the A/D converter (hereinafter referred to as reproduced digital signal). This reproduced digital signal is stored in an area of the RAM designated by predetermined addresses corresponding to the respective pixels (hereinafter referred to as reproduced-signal-storage RAM area).

The caused electric noise digital signal is subtracted from a reproduced digital signal corresponding to one specific pixel of the reproduced-signal-storage RAM area. A digital signal obtained as a result of this subtraction (hereinafter referred to as digital reproduced signal after noise reduction) is stored in a memory corresponding to the one specified pixel in the reproduced-signal-storage RAM area. An arithmetic operation for noise reduction is finished by applying such operation to all the pixels. This subtraction is performed as digital processing by a central processing unit (CPU) provided in the control unit 60.

In the embodiment, the caused electric noise digital signal, the reproduced digital signal, and the digital reproduced signal after noise reduction are processed as digitized electric signals, respectively. However, it is also possible to use an analog memory (e.g., a capacitor) and store respective analog electric signals as they are and, in the arithmetic operation, perform the subtraction using an operational amplifier without using the CPU. In such a case, the caused electric noise digital signal, the reproduced digital signal, and the digital reproduced signal after noise reduction are referred to as a caused electric noise analog signal, a reproduced analog signal, and an analog reproduced signal after noise reduction, respectively. The caused electric noise digital signal and the caused electric noise analog signal are collectively referred to as a caused electric noise signal. The reproduced digital signal and the reproduced analog signal are collectively referred to as a reproduced signal. The digital reproduced signal after noise reduction and the analog reproduced signal after noise reduction are collectively referred to as a reproduced signal after noise reduction.

In the caused electric noise signals detected by the detection methods according to the first and second embodiments, some noise is definite noise caused by a failure or the like of a specific pixel. However, most of noise components have a characteristic that the noise components fluctuate at random according to the change of time. Thus, it is possible to accurately obtain a caused electric noise digital signal by irradiating reference light plural times by varying time of the irradiation, obtaining diffractive light from an identical hologram in a recording layer plural times according to irradiation of reference lights in the image sensor 25, and subjecting caused electric noise digital signals to averaging processing.

(Results of an Experiment)

The noise reduction processing in the hologram recording and reproducing apparatus 100 is performed as processing in the Inside of the control unit 60 in the hologram recording and reproducing apparatus 100. Thus, it is difficult to quantitatively grasp a process of an action of noise reduction. Therefore, an experiment described below was performed and a noise reduction effect was check; in order to quantitatively grasp the effect of the action of noise reduction.

The experiment was carried out in an order described below. In the hologram recording and reproducing apparatus 100, the processing for noise reduction was performed and, in order to make it possible to visually recognize steps of the processing, an arrangement was made to make it possible to visually observe content of the processing steps using a monitor. Specifically, digital information representing steps of processing in the control unit 60 is extracted to the outside via a bus line of the CPU to make it possible to visually recognize the digital information with the monitor. FIGS. 6 to 10, 12, 14, 16, and 18 are photographs of screens displayed on the monitor in this way.

Figure 6A:
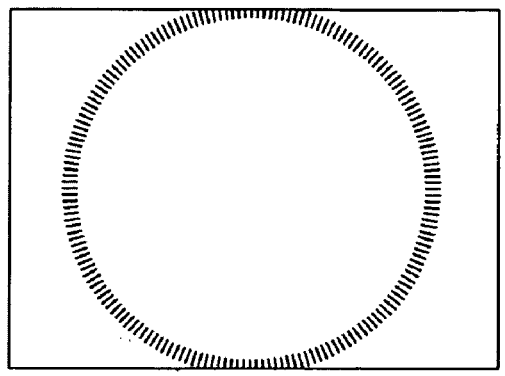
FIGS. 6A to 6C are illustrations representative of monitor images obtained as a result of an experiment.
Figure 6B:
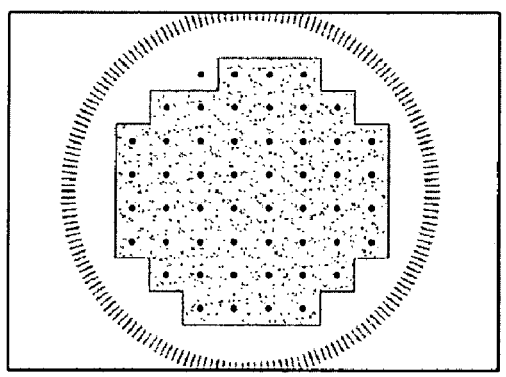
Figure 6C:
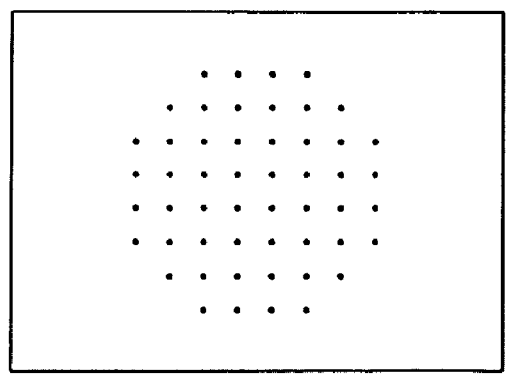

FIGS. 6A to 6C are illustrations showing a result of an experiment for checking an operation for reducing the first caused electric noise signal. In FIG. 6A, only the reference light 41 is made incident on an area of the recording layer 50a in which a hologram is not recorded of the hologram recording medium 50, an electric signal corresponding to an image formed on the image sensor 25 by the diffractive light 43 generated at the incidence of the reference light 41 is subjected to A/D conversion, a caused electric noise digital signal is obtained, and this caused electric noise digital signal is displayed on the monitor. The caused electric noise digital signal is the first caused electric noise digital signal. As it is seen from FIG. 6A, regardless of the fact that all the pixels of the signal-light spatial-light modulating section 46 (see FIG. 2) of the spatial light modulator 22 are set to be the white portion, since a contrast of the SLM in the spatial light modulator 22 is not satisfactory, an obtained monitor image is not completely white. Interference fringes due to an optical system such as a lens are also observed.

In FIG. 6B, only the reference light 41 is made incident on an area of the recording layer 50a in which a hologram is recorded of the hologram recording medium 50, an electric signal corresponding to an image formed on the image sensor 25 by the diffractive light 43 generated at the incidence of the reference light 41 is subjected to A/D conversion, a reproduced digital signal is obtained, and this reproduced digital signal is displayed on the monitor. As it is seen from FIG. 6B, a diffractive light receiving section of the image sensor 25 (the center in FIG. 6B) gleams because of an influence of the SLM contrast electric noise signal. This diffractive light receiving section is a light receiving section in a position corresponding to the signal-light spatial-light modulating section 46 (see FIG. 2) of the spatial light modulator 22.

In FIG. 6B, a signal to noise ratio (SNR) of a reproduced digital signal as a basis of a screen visually displayed on the monitor was 2.84 and the number of symbols of wrong recording data was 92.

In FIG. 6C, in the hologram recording and reproducing apparatus 100, the digital reproduced signal after noise reduction after the processing for noise reduction is displayed as an image on a monitor. As it is seen from FIG. 6C, since the SLM contrast electric noise signal is subtracted, the influence of the noise due to the contrast of the SLM in the diffractive light receiving section (the center in FIG. 6C) is relaxed and an image of a quality higher than that of a reproduced image originally generated in the image sensor 25 is formed as an image on the monitor. A signal to noise ratio of a reproduced digital signal at this point was 3.37 and the number of symbols of wrong recording data was 18. It is seen that the signal to noise ratio is substantially improved and the number of signals of wrong recording data is substantially reduced. In other words, according to the processing for noise reduction in the control unit 60, it is possible to obtain a reproduction characteristic equivalent to the fact that an electric signal in the case of generation of a reproduced image shown in FIG. 6C in the image sensor 25 is obtained from the image sensor 25.

Figure 7C:
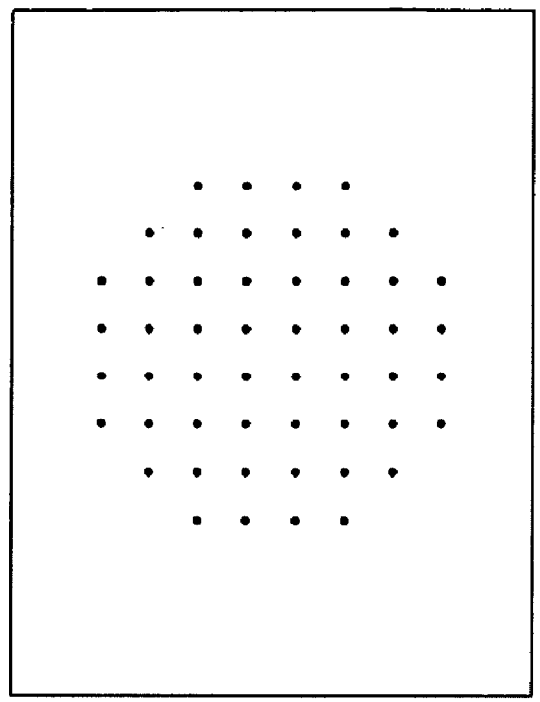
FIGS. 7A and 7C are illustrations representative of monitor images obtained as a result of an experiment.
Figure 7A:
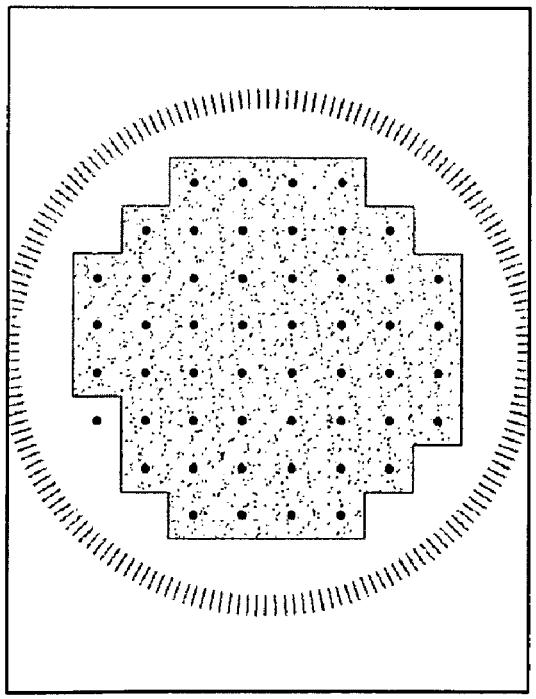
Figure 8C:
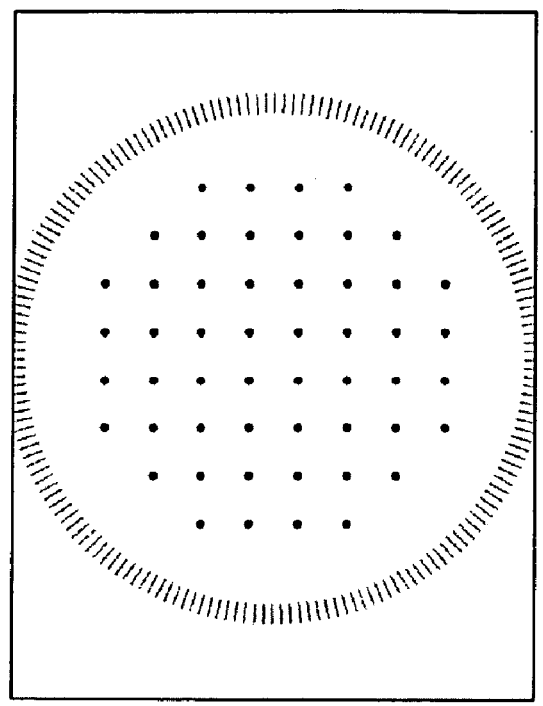
FIGS. 8A and 8C are illustrations representative of monitor images obtained as a result of an experiment.
Figure 8A:
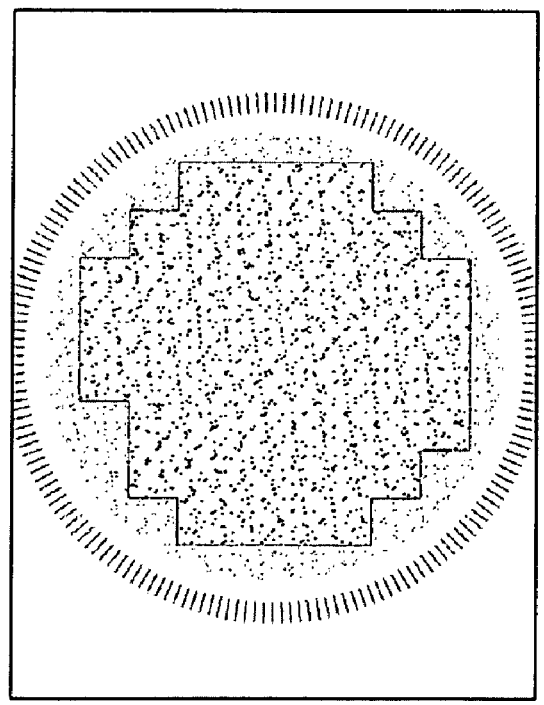
Figure 9C:
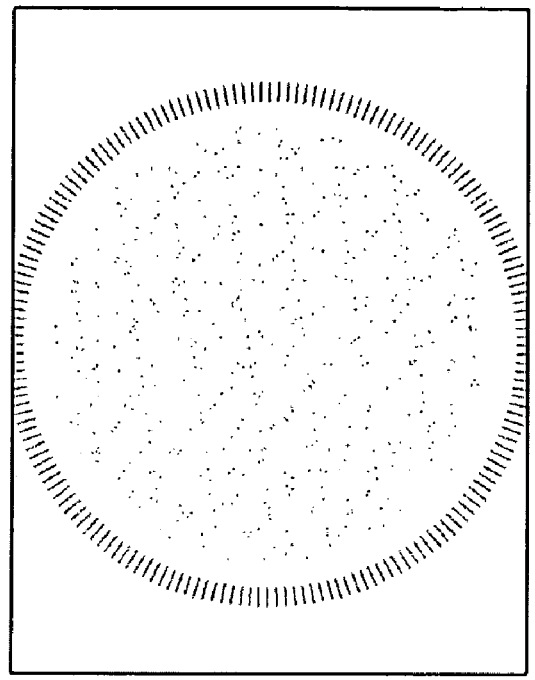
FIGS. 9A and 9C are illustrations representative of monitor images obtained as a result of an experiment.
Figure 9A:
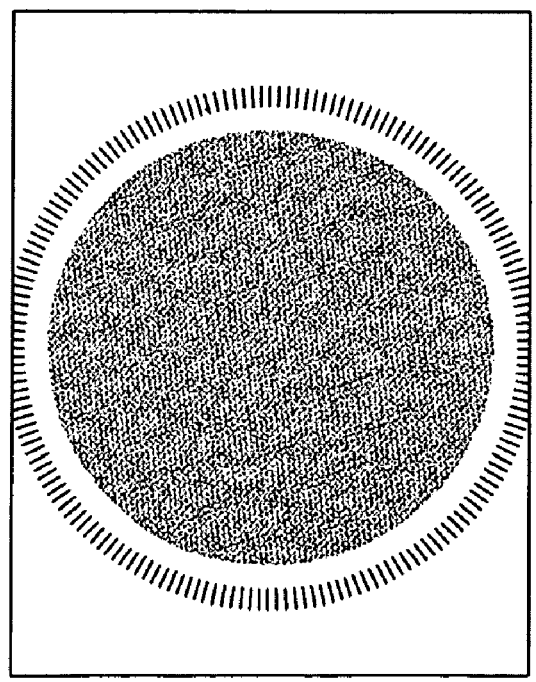

In FIGS. 7A and 7C, 8A and 8C, and 9A and 9C, illustrations of images on the monitor obtained from reproduced digital signals and images on the monitor obtained from digital reproduced signals after noise reduction at the time when the light intensity of reference light is changed are compared. Results obtained by detecting first caused electric noise signals are detected according to the light intensities of respective reference lights and performing the processing for noise reduction. FIGS. 7A and 7C show a result at the time when a value of an electric current fed to the laser beam source 20 is set to 50 mA (milliamperes). FIG. 7A shows illustration of an image on the monitor obtained from a reproduced digital signal. FIG. 7C shows illustration of an image on the monitor obtained from a digital reproduced signal after noise reduction. FIGS. 8A and 8C show a result at the time when a value of an electric current fed to the laser beam source 20 is set to 60 mA (milliamperes). FIG. 8A shows illustration of an image on the monitor obtained from a reproduced digital signal. FIG. 8C shows illustration of an image on the monitor obtained from a digital reproduced signal after noise reduction. FIGS. 9A and 9C show a result at the time when a value of an electric current fed to the laser beam source 20 is set to 70 mA (milliamperes). FIG. 9A shows illustration of an image on the monitor obtained from a reproduced digital signal. FIG. 9C shows illustration of an image on the monitor obtained from a digital reproduced signal after noise reduction.

When a value of an electric signal fed to the laser beam source 20 is increased, i.e., when the light intensity of reference light is increased, an amount of noise due to a contrast of the SLM also increases. However, in both the cases, a signal to noise ratio is improved and the number of caused symbol errors is reduced by the processing for noise reduction. Specifically, when the value of the electric current fed to the laser beam source 20 was 50 mA, the signal to noise ratio was improved from 2.84 to 3.37 and the number of wrong symbols was reduced from 92 to 18. When the value of the electric current fed to the laser beam source 20 was 60 mA, the signal to noise ratio was improved from 2.28 to 2.42 and the number of wrong symbols was reduced from 228 to 111. When the value of the electric current fed to the laser beam source 20 was 70 mA, the signal to noise ratio was improved from 1.65 to 1.8 and the number of wrong symbols was reduced from 679 to 595.

(Another Result of an Experiment)

The result of the experiment described above is the result of the experiment for checking the operation for reducing the first caused electric noise signal. As another result of an experiment, a result of an experiment for checking an operation for reducing the second caused electric noise signal in which fixed pattern noise (FPN) is predominant is described below.

Figure 10A:
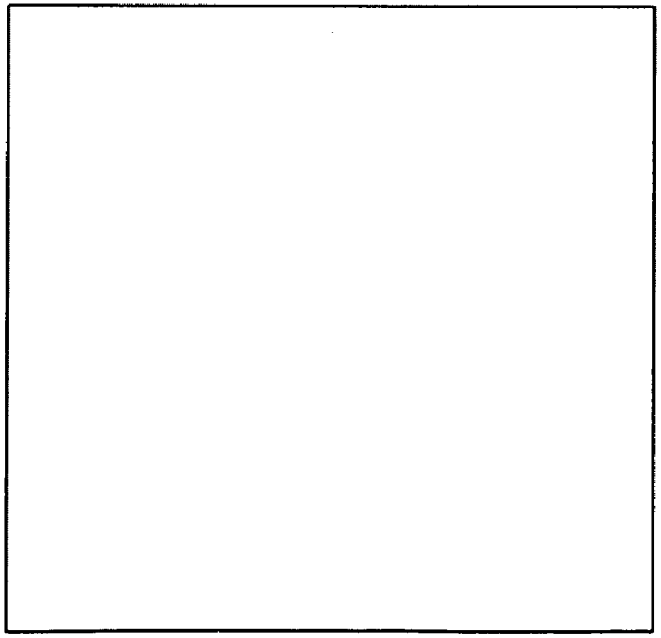
FIG. 10A is an illustration representative of a monitor image obtained as a result of an experiment.
Figure 10B:
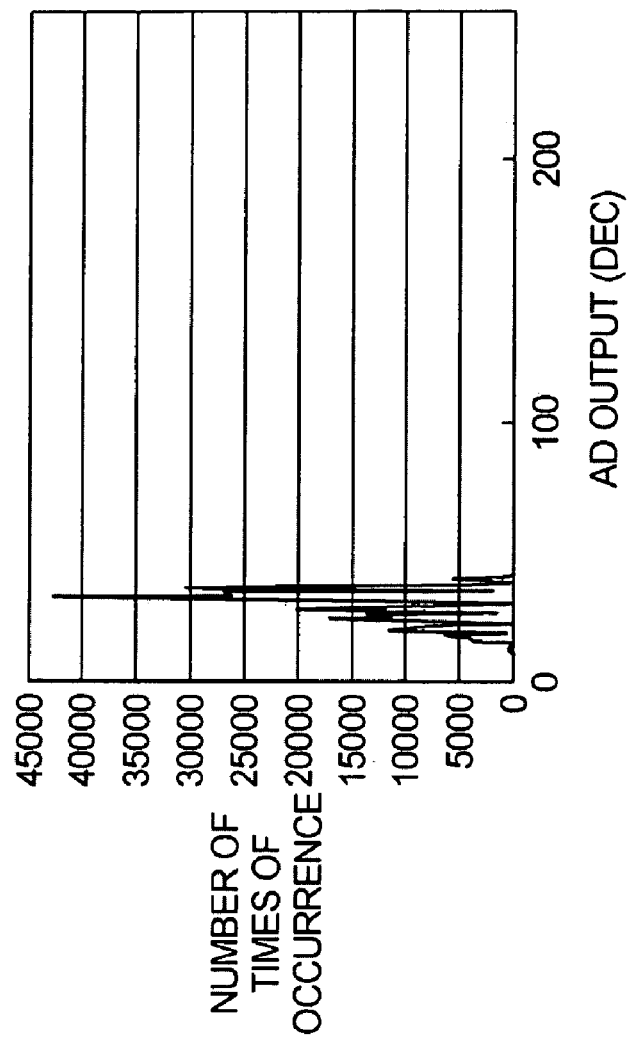
FIG. 10B is a graph showing an output frequency distribution after A/D conversion.

In FIG. 10A, a reproduced digital signal in a state in which the emission of a light beam from the laser beam source 20 is stopped is shown as an image on the monitor. The image is the same as an image appearing on the light-receiving surface of the image sensor 25 of the hologram recording and reproducing apparatus 100. FIG. 10B is a graph (a histogram) showing an output frequency distribution after A/D conversion obtained by analyzing the reproduced digital signal in a state in which the emission of a light beam from the laser beam source 20 is stopped. The abscissa of the histogram represents the amplitude of an output after the A/D conversion and the ordinate thereof represents the number of times of occurrence.

Figure 11B:
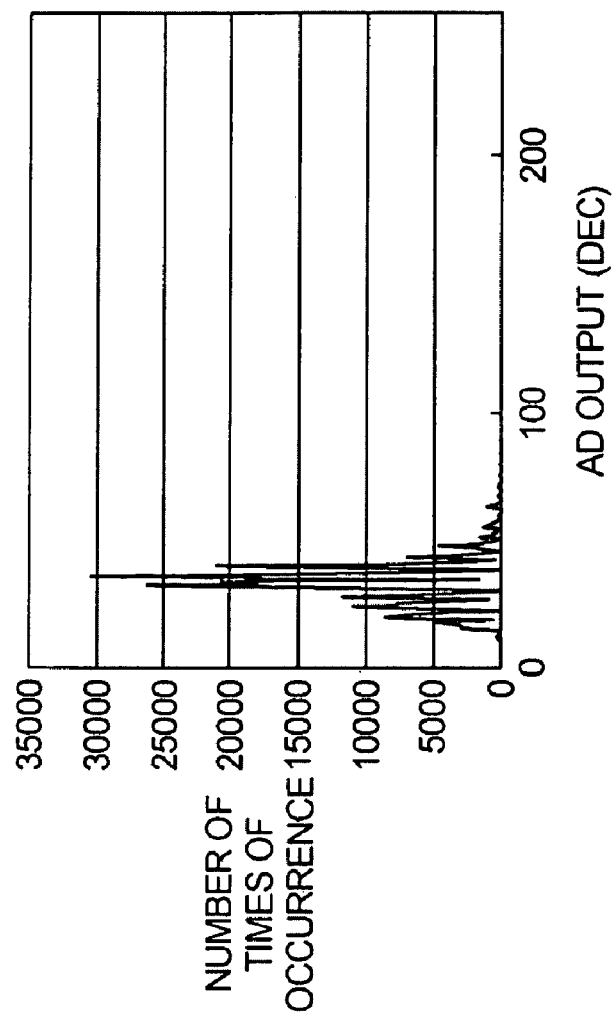
FIG. 11B is a diagram showing an output frequency distribution after A/D conversion.
Figure 11A:
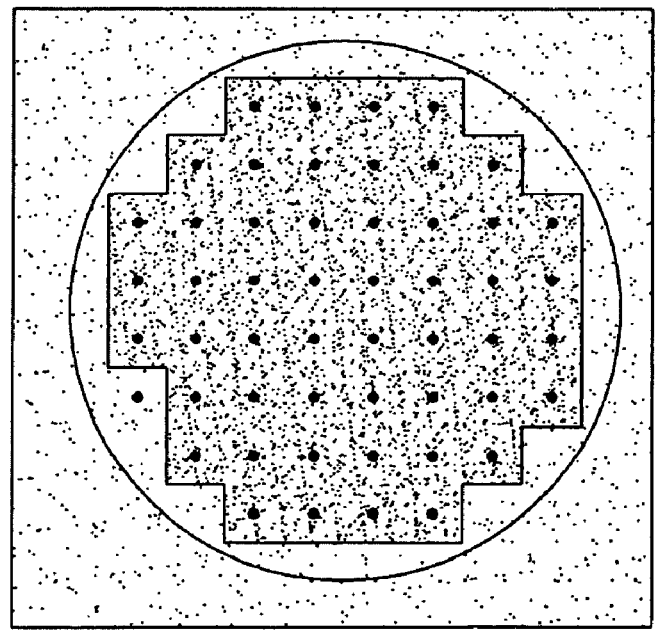
FIG. 11A is an illustration representative of a monitor image obtained as a result of an experiment.

In FIG. 11A, a reproduced digital signal obtained by irradiating a light beam from the laser beam source 20 on a hologram is shown as an image on the monitor. The image is substantially the same as a reproduced image appearing on the light-receiving surface of the image sensor 25 of the hologram recording and reproducing apparatus 100. FIG. 10B is a histogram obtained by analyzing the reproduced digital signal obtained by irradiating the light beam from the laser beam source 20 on the hologram.

Figure 12B:
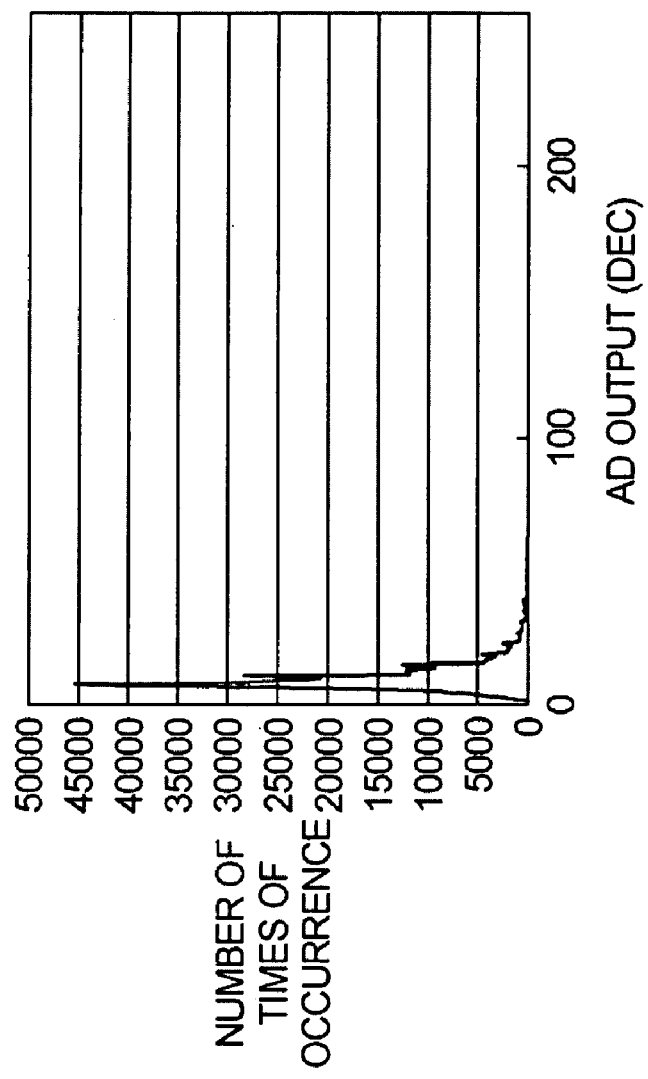
FIG. 12B is a graph showing an output frequency distribution after A/D conversion.
Figure 12A:
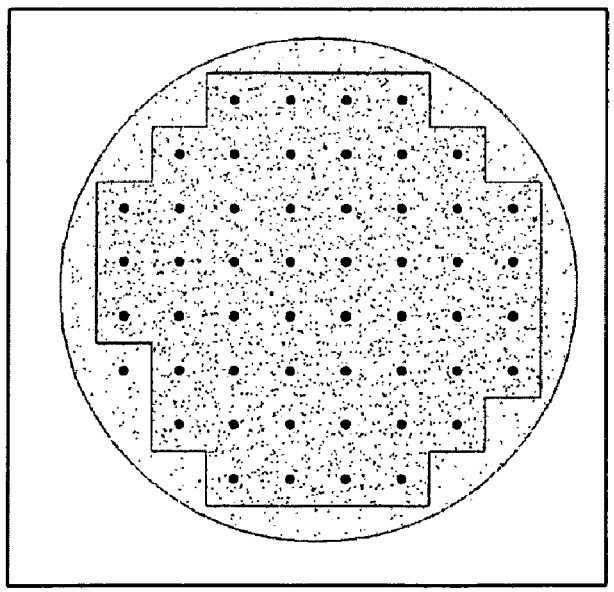
FIG. 12A is an illustration representative of a monitor image obtained as a result of an experiment.

In FIG. 12A, a digital reproduced signal after noise reduction obtained by subtracting a second cause electric noise signal from a reproduced digital signal obtained by irradiating a light beam from the laser beam source 20 on a hologram is shown as an image on the monitor. A result of an arithmetic operation performed by the control unit 60 of the hologram recording and reproducing apparatus 100 is shown as an image. FIG. 12B is a histogram obtained by analyzing the result of the arithmetic operation performed by the control unit 60.

When FIG. 11A and FIG. 12A are compared and FIG. 11B and FIG. 12B are compared, it is seen that, after the processing for noise reduction, background noise in a dark state and a second caused electric noise signal as an electric signal are removed and a satisfactory reproduction characteristic is obtained.

Figure 14A:
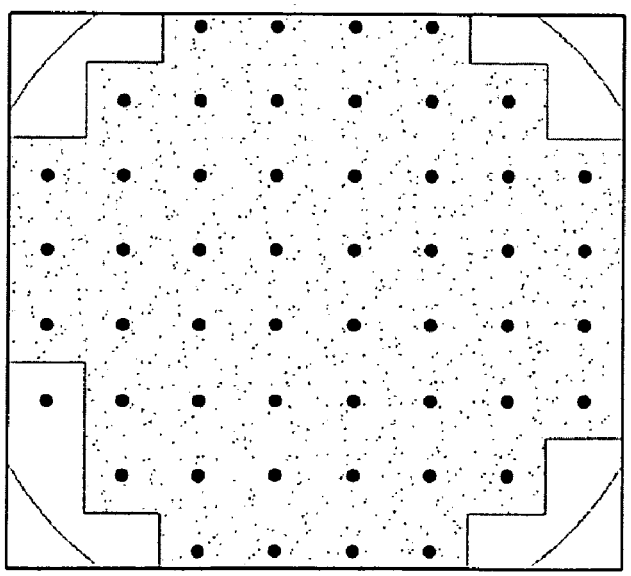
FIG. 14A is an illustration representative of a monitor image obtained as a result of an experiment.
Figure 14B:
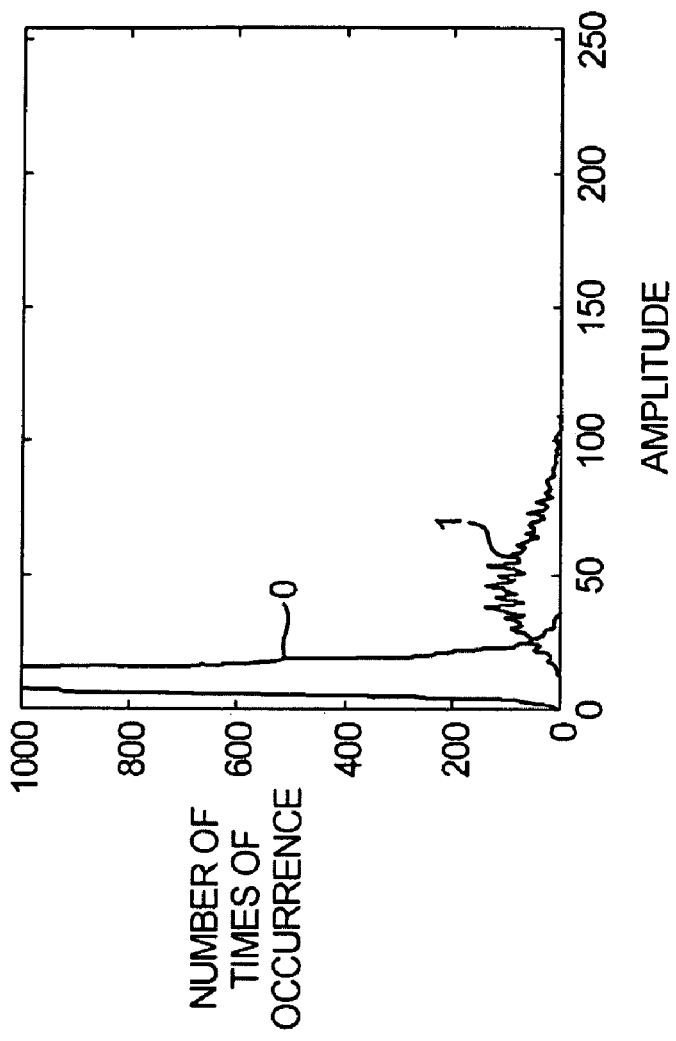
FIG. 14B is a graph showing an output frequency distribution after A/D conversion.

In FIG. 13A, a reproduced digital signal as an electric signal before the processing for noise reduction is displayed as an image on the monitor. FIG. 13B is a histogram obtained by analyzing the reproduced digital signal. A graph denoted by reference numeral 0 represents a distribution of a reproduced digital signal that originally takes a value 0 when binarized. A graph denoted by reference numeral 1 represents a distribution of a reproduced digital signal that originally takes a value 1 when binarized. In FIG. 14A, a digital reproduced signal after noise reduction as an electric signal after the processing for noise reduction in the hologram recording and reproducing apparatus 100 is displayed as an illustration of an image on the monitor. FIG. 14B is a histogram obtained by analyzing the digital reproduced signal after noise reduction. Reference numeral 0 and reference numeral 1 have the same meanings as those in FIG. 13B.

The effect of the noise reduction is specifically explained by comparing FIGS. 13A and 13B and FIGS. 14A and 14B, A signal to noise ratio is improved and the number of wrong symbols is reduced by removing dark state background noise (FPN), i.e., the second caused electric noise signal as the electric signal according to subtraction. Before the removal of dark state background noise, 1.80 was obtained as a value of the signal to noise ratio. However, after the removal of the dark state background noise, 1.92 was obtained as a value of the signal to noise ratio. After the removal of the dark state background noise, the number of wrong symbols was reduced from 95 to 72. The signal to noise ratio was calculated from Equation (1) by calculating dispersions ($\sigma 0, \sigma 1$) and averages ($\mu 0, \mu 1$) of the graphs assuming that the graphs denoted by reference numeral 0 and reference numeral 1 are Gaussian distributions.

Signal to noise ratio (SNR)=$(\mu 1-\mu 0)/(\sigma 1+\sigma 0)1/2$  (1)

Figure 16:
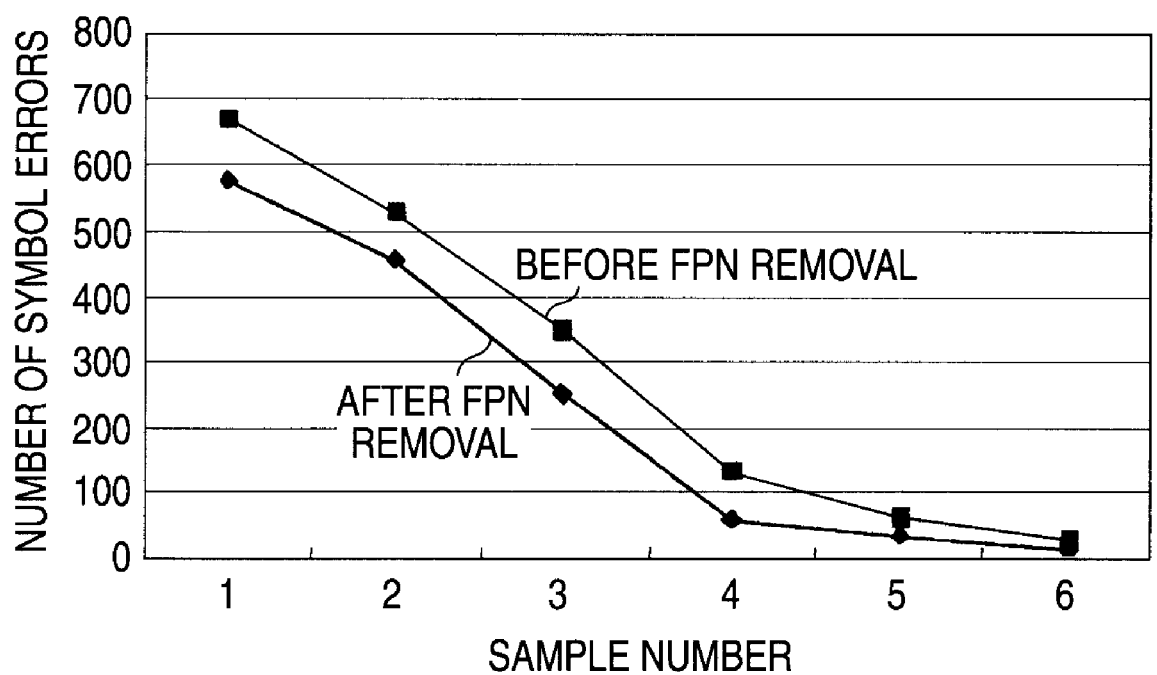
FIG. 16 is a graph of the result of the experiment indicating the effect of noise reduction for plural samples.

A result of applying the same processing to six samples of different holograms to display the effect of error reduction is shown in FIGS. 15 and 16. FIG. 15 is a table of comparison of the numbers of wrong symbols before the processing for noise reduction for the six samples and after the processing for noise reduction. FIG. 16 is a graph of comparison of the numbers of wrong symbols before the processing for noise reduction for the six samples and after the processing for noise reduction. It is seen from this result that 20% to 30% of symbol errors can be reduced by the technique for noise reduction according to this embodiment.

(Flow of the Noise Reduction Processing)

The processing performed by the CPU in the control unit 60 is explained with reference to FIG. 17. A flowchart in FIG. 17 is a flowchart of processing for reducing the first caused electric noise signal.

The CPU irradiates reference light on an area in which a hologram is not formed of the recording layer (e.g., a header area) (step ST100).

The CPU detects signals (unrecorded-portion reproduced digital signals) from respective pixels corresponding to an image on the image sensor generated by a light beam from the area in which a hologram is not formed of the recording layer and stores the signals in a noise-storage RAM area (step ST101).

The CPU irradiates the reference light on an area in which a hologram is formed of the recording layer (step ST102).

The CPU detects signals (reproduced digital signals) from respective pixels corresponding to an image on the image sensor generated by diffractive light from the area in which the hologram is formed of the recording layer and stores the signals in a reproduced-signal-storage RAM area (step ST103).

The CPU subtracts, for the respective pixels, the unrecorded-portion reproduced digital signals stored in the noise-storage RAM area from the reproduced digital signals stored in the reproduced-signal-storage RAM area to obtain a digital reproduced signal after noise reduction (step ST104).

The CPU processes the digital reproduced signal after noise reduction to obtain recording data (step ST105).

According to this embodiment, it is possible to remove an optical-system-caused electric noise caused by an optical system such as stray light noise. If is also possible to remove media-caused-electric noise caused by a hologram recording medium.

In particular, when a coaxial optical system is adopted, since reference light and signal light are present in extremely close positions and the reference light has light intensity larger than that of the diffractive light by about 2 to 3 digits, reference light leak noise occurs. However, it is possible to effectively remove this reference light leak noise.

When the coaxial optical system is adopted, the reference light and the signal light are obtained an identical light beam, i.e., light beams having identical light intensity. Since the reference light has light intensity larger than that of the diffractive light by about 2 to 3 digits, when an SLM having a poor contrast is adopted, pixels of a signal-light spatial-light modulating section are not entirely the black portion. As a result, SLM contrast, noise occurs. However, it is possible to effectively remove this SLM contrast noise.

Reference light is irradiated plural times on an identical hologram not having information or an area in winch a hologram is not recorded and electric signals in the plural times of irradiation of the reference light are obtained from diffractive light. By performing processing for averaging the electric signals at any time during start of the hologram recording and reproducing apparatus, noises typically detected from predetermined pixels definitely are added up. Thus, it is possible to more accurately and definitely remove the caused electric noise signal.

It is also possible to remove the circuit-unit-caused electric noise signal as noise independent of the optical system and the hologram recording medium.

Circuit-unit-caused electric noise signals as noises independent of the optical system and the hologram recording medium are obtained plural times. By performing processing for averaging the circuit-unit-caused electric noise signals at any time during start of the hologram recording and reproducing apparatus, it is possible to definitely remove the circuit-unit-caused electronic noise signals.

Since the hologram recording medium is a recording medium having compatibility, when the hologram recording and reproducing apparatus and the hologram recording medium are appropriately combined, noise detected by the image sensor has various magnitudes. If the technique for noise reduction described in the embodiment is used, it is possible to easily secure the compatibility of the hologram recording medium.

If the first caused electric noise signal and the second caused electric noise signal are multiplied by coefficients, respectively, weighted, and subtracted from an electric, signal from the image sensor, it is possible to effectively reduce an influence of noise based on plural causes.

All the embodiments described above are merely embodiments of the present application. The present invention is not limited to the embodiments. For example, in the above explanation, the coaxial system for coaxially arranging signal light and reference light is explained. In a dual light beam system for making signal light and reference light on a hologram recording medium via different optical components, it is possible to carry out the present invention on the basis of the identical technical idea. Further, for example, concerning a spatial light modulator, regardless of whether the spatial light modulator is a transmission type or a reflection type, it is possible to carry out the present invention using the spatial light modulator.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A hologram reproducing apparatus that reproduces recording data from a hologram formed in a recording layer of a hologram recording medium by causing signal light modulated according to the recording data and reference light from a light source identical with that of the signal light to interfere with each other, the hologram reproducing apparatus comprising:
   a reference-light spatial-light modulating section that displays a reference light pattern for generating the reference light;
   an image sensor that has pixels arrayed two-dimensionally that receive diffractive light generated by irradiating the reference light on the hologram recording medium; and
   a control unit that processes an electric signal from the image sensor and reproduces the recording data, wherein the control unit detects a predetermined area electric signal, which is an electric signal from the image sensor obtained by irradiating the reference light on a predetermined area of the hologram recording medium, detects a hologram electric signal, which is an electric signal from the image sensor obtained by irradiating the reference light on an area in which the hologram is formed of the hologram recording medium, subtracts the predetermined area electric signal from the hologram electric signal to obtain a reproduced signal after noise reduction, and reproduces the recording data from the reproduced signal after noise reduction.

2. A hologram reproducing apparatus according to claim 1, wherein the predetermined area electric signal is the electric signal detected from the area in which a hologram is not formed.

3. A hologram reproducing apparatus according to claim 1, further comprising a coaxial optical system in which the reference light and the signal light are coaxially arranged on an optical path.

4. A hologram reproducing apparatus according to claim 1, wherein the predetermined area is an area in which header information is recorded of the hologram recording medium.

* * * * *